United States Patent [19]

Martinelli

[11] 4,345,891

[45] Aug. 24, 1982

[54] APPARATUS AND METHOD FOR FUZZ REMOVAL FROM EDGES OF SHEET MATERIAL

[75] Inventor: Lawrence G. Martinelli, San Jose, Calif.

[73] Assignee: Verbatim Corporation, Sunnyvale, Calif.

[21] Appl. No.: 153,866

[22] Filed: May 28, 1980

[51] Int. Cl.³ .............. B29C 17/08; B29C 17/12
[52] U.S. Cl. .................................. 425/289; 264/80; 425/806
[58] Field of Search .............. 425/806, 289; 264/80; 148/9 R, 9.5 R; 266/48

[56] References Cited

U.S. PATENT DOCUMENTS

| 1,870,564 | 8/1932 | Hayden | 425/806 |
| 2,849,347 | 8/1958 | Uziel | 425/806 |
| 2,967,326 | 1/1961 | Collins et al. | 264/80 |
| 3,085,292 | 4/1963 | Kindseth | 425/806 |
| 3,475,229 | 10/1969 | Geen et al. | 148/9 |
| 3,608,879 | 9/1971 | Birr | 148/95 |

FOREIGN PATENT DOCUMENTS 621586 8/1978 U.S.S.R. .............. 264/80

Primary Examiner—James H. Derrington
Attorney, Agent, or Firm—Thomas E. Schatzel

[57] ABSTRACT

Apparatus and method for rapidly removing fuzz from about the edges of sheets of material and apertures within those sheets without damaging the sheet material performed by passing the sheet quickly through a flame.

11 Claims, 7 Drawing Figures

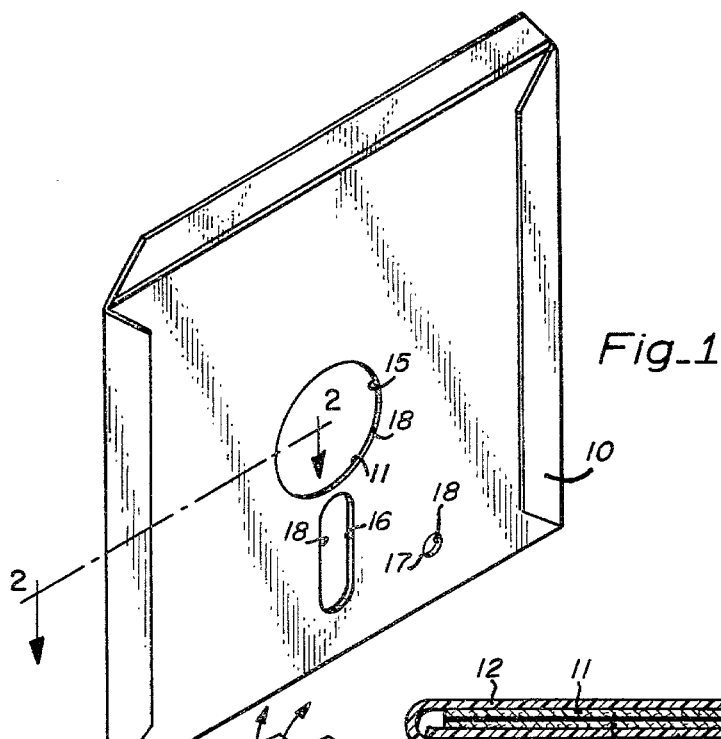
Fig_1
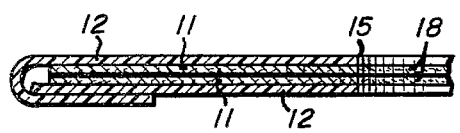
Fig_2
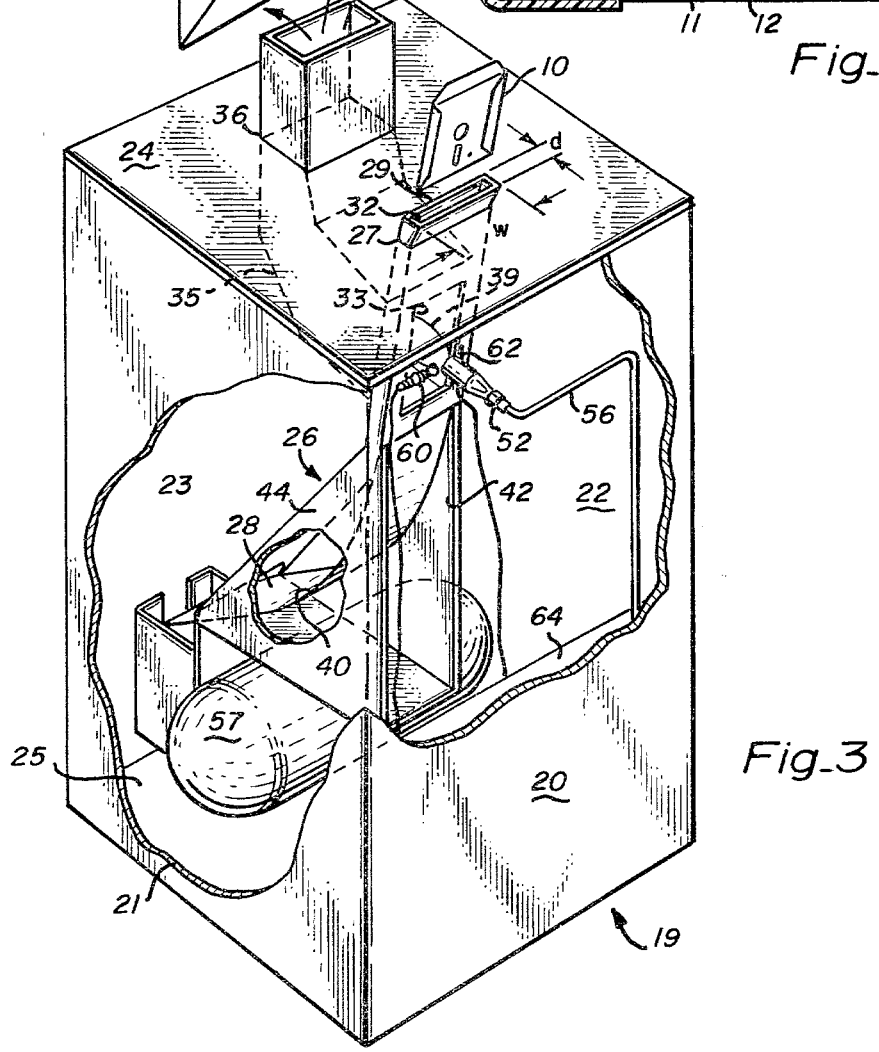
Fig_3

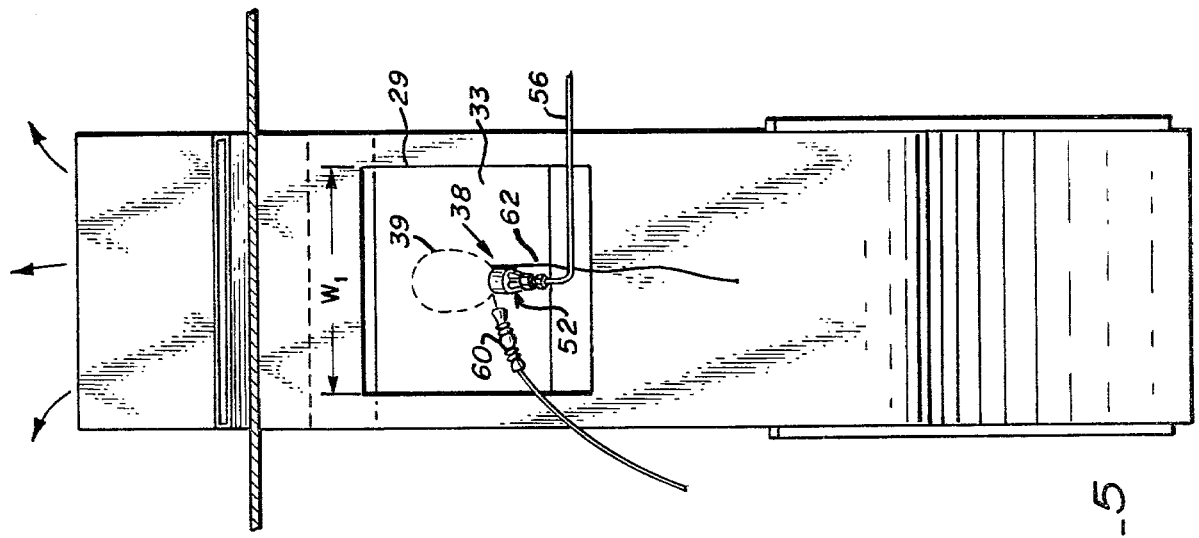
Fig_5
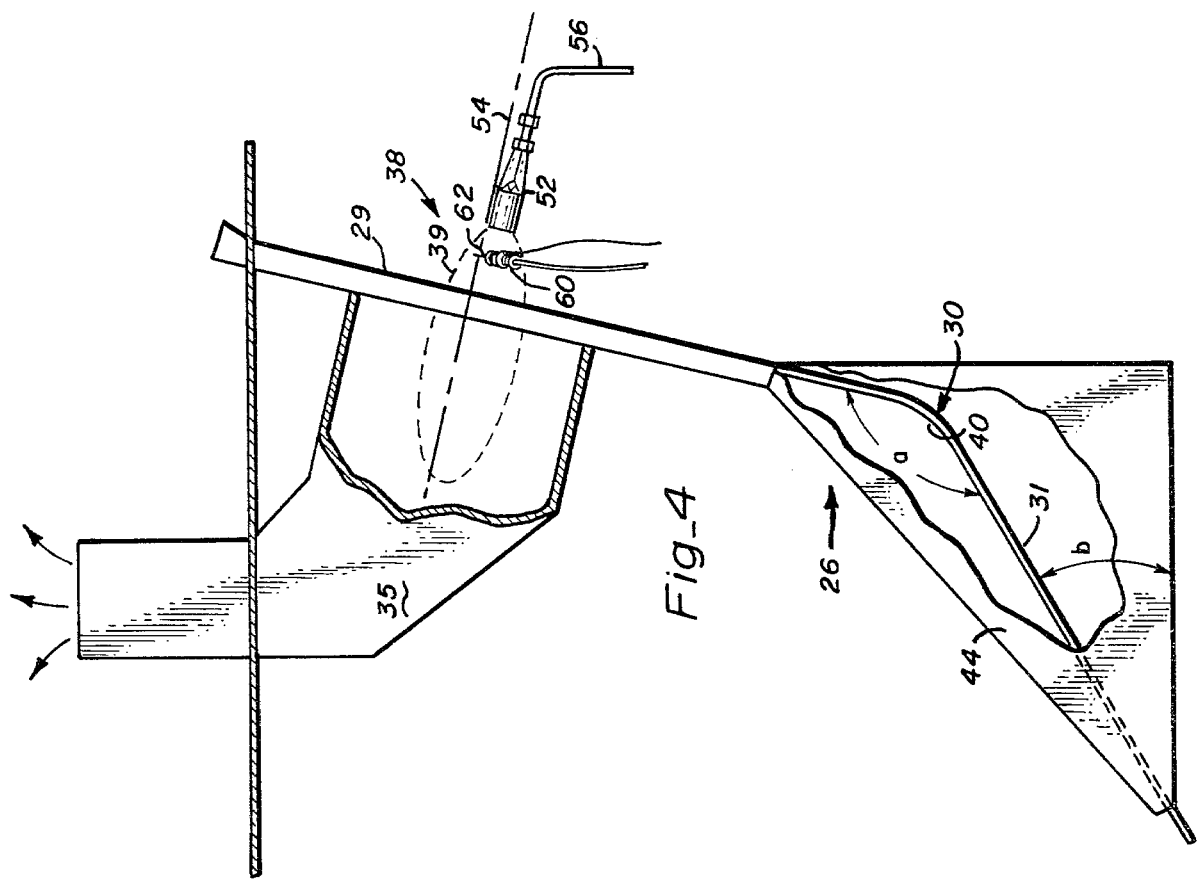
Fig_4

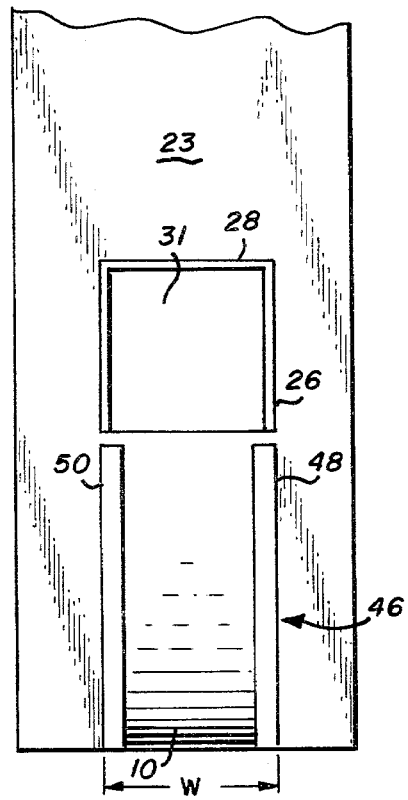
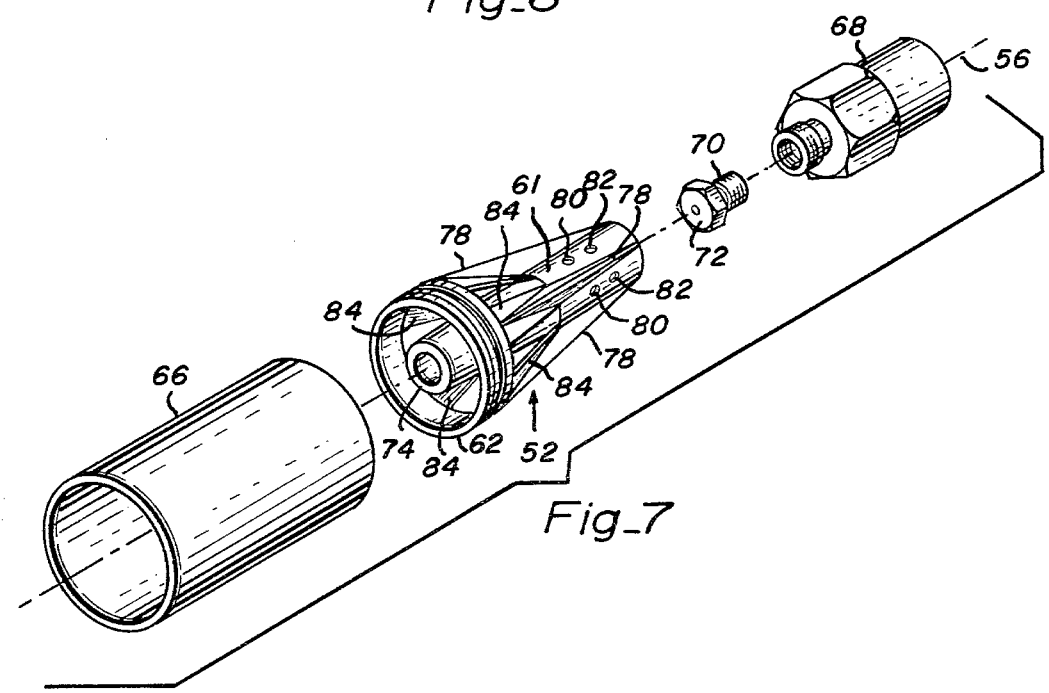

APPARATUS AND METHOD FOR FUZZ REMOVAL FROM EDGES OF SHEET MATERIAL

BACKGROUND OF THE INVENTION

1. Field of the Invention

The present invention relates generally to the removal of fuzz from articles of manufacture and more particularly to the removal of fuzz from envelopes used to enclose flexible, interchangeable computer memory disks without damaging the exterior surface of the envelope.

2. Description of the Prior Art

There are many instances wherein fibrous types of materials are used in products. For example, widely used in the computer industry is a data storage medium which consists of a circular disk of flexible material coated with magnetic particles. These disks are known in the trade as "floppy disks." Generally, the disk drive apparatus which is used to drive the disk and write data to and read data from floppy disks is designed so as to permit interchanging of disks. It is necessary to protect the recording surfaces of the disks from dust and other contaminants, both while the disk is installed in the disk drive apparatus and while the disks are stored when removed from that apparatus. The most widely known approach in the industry for protecting the floppy disks is by permanently sealing them into an envelope. The envelope has apertures adapted so that access may be had to the disk for coupling the disk drive to allow the disk to be driven and access by the transducer so that information may be recorded or reproduced while the disk is in the envelope. These envelopes normally have an aperture at their center which permits engagement of the circular disk with a drive spindle of the disk drive apparatus. A radially positioned oblong aperture in the envelope permits a magnetic transducer to interact with the disk to allow recording or reproducing of information thereon while the disk is rotated within the envelope by the drive spindle. Other apertures may be included, e.g. a circular aperture to permit an optical transducer to sense sectors of the disk.

The material used to construct these envelopes, as taught in U.S. Pat. Nos. 3,668,658, granted to Flores, et al., consists of two sheets or layers permanently bonded to each other. The outer sheet or layer is solid to provide mechanical protection for the recording disk. The inner layer, which is in intimate contact with the circular disk, consists of a sheet of porous, fibrous, low-friction, anti-static material whose properties permit the disk to rotate easily within the envelope and, in addition, clean the recording surfaces of dust, wear products and airborne contaminants. The process by which these envelopes are manufactured consists in first bonding continuous sheets of these two materials to each other and then mechanically punching the envelope apertures. Often the properties of the materials used to fabricate such envelopes are such that the outer solid layer has a lower melting temperature than the inner porous, low friction, anti-static layer. For example, frequently the outer layer is vinyl and the inner layer comprises bonded polyster fibres.

After the edges of an envelope have been cut and the apertures have been punched, "fuzz" from the inner, porous, low-friction, anti-static layer of envelope material remains around the edges of the sheet and of the apertures. The "fuzz" is in the form of small pieces of string-like material created along the edges of the sheets of material. This fuzz frequently results from the shearing, punching or cutting action. Excessive amounts of such fuzz in the completed assembly, consisting of the floppy disk sealed within its envelope, contaminate the drive mechanism and the transducer apparatus used to write data to and read data from the recording disk and interfere with its proper operation. Thus, it is necessary to minimize the amount of fuzz when producing and manufacturing the floppy disks.

Heretofore, the method employed to control the amount of fuzz present around the edges of the apertures of the envelopes consisted in keeping the punching tools sharp and discarding envelopes which had excessive amounts of fuzz. As a result, minimization of fuzz has been difficult and costly.

U.S. Pat. No. 2,967,326, granted to Collins, et al., teaches a method and apparatus for removing flash from the interior passages of articles molded under pressure in a two-part mold of material which is readily combustible and/or otherwise decomposible at elevated temperature. The method taught by Collins consists of exposing the article to a flow of hot gases and either protecting the interior surfaces of the passages with shields or, alternatively exposing them to a second flow of cooling gases immediately after the exposure to the flow of hot gases.

SUMMARY OF THE PRESENT INVENTION

An object of the present invention is to provide a simple and improved method of removing fuzz from both the peripheral edges of sheets of material and the edges of apertures within such sheets, particularly from sheets of material which is combustible or otherwise decomposible by heat, without damaging the sheets of material.

Another object of the present invention is to provide a simple and improved method of removing fuzz from both the peripheral edges of sheets of material and the edges of apertures within such sheets, particularly from sheets of material fabricated by bonding a sheet of porous, combustible or heat decomposible material to a sheet of solid material, without damaging either layer of material.

Another object of the present invention is to provide a simple and improved method of removing fuzz both from the peripheral edges of sheets of material and the edges of apertures within such sheets, particularly from sheets of material fabricated by bonding a sheet of porous, combustible or heat-decomposible material to a sheet of solid material having a lower melting temperature than the porous material, without damaging either layer of material.

Another object of the present invention is to provide a simple and improved method of removing fuzz from both the peripheral edges of sheets of material and the edges of apertures within such sheets, particularly from sheets used to fabricate the envelopes into which circular disks of flexible recording material are inserted and sealed, without damaging the sheets of material.

A further object of the present invention is to provide a novel apparatus for removing fuzz from both the peripheral edges of sheets of material and the edges of apertures within such sheets, particularly from sheets used to fabricate the envelopes into which circular disks of flexible recording material are inserted and sealed, without damaging the sheets of material.

Another object is to provide apparatus for removing fuzz from edges of materials which is rapid and economical and capable of being used in production facilities.

Briefly, this invention pertains to the use of a heated gaseous flow, e.g. a high velocity flame, to remove fuzz from the edges of sheets of material and apertures within those sheets by passing the sheet of material in a continuous motion quickly through an area where the flame penetrates. The apparatus which performs this operation consists of a sloped chute forming a track into which the sheet of material or assembled envelope may be inserted and let to fall freely through a region in that chute which is exposed to and penetrated by a high velocity flame created by a flame source directed towards the area through which the sheet passes.

This method and apparatus has the advantage of requiring neither a shield to protect the interior edges of the aperture nor the application of a second flow of cooling gases immediately following the application of the flame.

A further advantage is that the fuzz can be removed very rapidly and large volumes of the objects may be processed in short periods of time.

These and other objects and advantages of the present invention will no doubt become obvious to those of ordinary skill in the art after having read the following detailed description of the preferred embodiment as illustrated in the various drawing figures.

IN THE DRAWING

FIG. 1 is a perspective view of a floppy disk envelope of the prior art;

FIG. 2 is a cross-sectional view of a portion of the floppy disk envelope of FIG. 1 taken along the line 2—2 illustrating the different layers of material and the fuzz around the edges of apertures in the envelope;

FIG. 3 is a perspective, partially-sectioned view of an embodiment of the fuzz removal apparatus of the present invention;

FIG. 4 is a diagrammatic side view of a part of the apparatus of FIG. 3 and illustrating the burner, chute and exhaust flue;

FIG. 5 is a front view of the apparatus of FIG. 3;

FIG. 6 is a back side view of the apparatus of FIG. 3; and

FIG. 7 is an exploded, perspective view of the burner of the apparatus of FIG. 3.

DETAILED DESCRIPTION OF THE PREFERRED EMBODIMENT

The fuzz removing apparatus and method of the present invention are illustrated herein in connection with an envelope used to contain a circular disk of magnetic recording material (not shown). Such structures are commonly referred to in the computer industry as floppy disks and the envelope is generally referred to as the floppy disk jacket.

FIG. 1 illustrates a perspective view of an envelope 10 for a "floppy disk" and FIG. 2 is a cross-sectional view taken along the line 2—2 of FIG. 1. The envelope 10 is formed by bonding a layer of porous, low-friction, anti-static material 11 to a layer of solid material 12, such as vinyl. The formed composite sheet is then cut to dimensions and folded to form the envelope 10. After folding, a plurality of apertures, for example 15, 16 and 17, are then punched into the envelope at desired locations. The aperture 15 is generally a circular hole to allow a drive spindle of a disk drive to engage the circular disk to drive the disk. The aperture 16 is generally of oblong shape to allow access by a record/reproduce transducer to record or reproduce data on or from the disk. Other apertures, for example, an aperture 17 may also be formed in the envelope for other purposes.

The punching operation used for forming the apertures generally leaves a volume of fuzz 18 remaining around the edges of the apertures. This fuzz is undesirable. Accumulation of the fuzz tends to interfere with the operation of the disk drive and the recording and reproducing of information from the floppy disk.

The present invention provides an improved apparatus and method for quickly and easily removing the fuzz 18 from the edges of the apertures 15, 16 and 17 and other apertures which may be in the envelope. The entire envelope 10, after it is folded and prior to insertion of the floppy recording disk, is passed quickly along a path which intersects with the path of a heated gaseous flow. The heated gaseous flow causes the fuzz to disintegrate but has no deleterious effects on the envelope material.

Apparatus, referred to by the general reference character 19, for removing the fuzz 18 is illustrated in FIGS. 3-7. The apparatus 19 has a front panel 20, a left side panel 21 joined perpendicularly to the front panel 20, a right side panel 22 joined perpendicular to the front panel 20 and a back side panel 23 extending between and engaged to the panels 21 and 22. A top wall 24 engages the top edges of each of the panels 20-23 and a bottom wall 25 engages each of the panels 20-23 at the opposite end thereof.

The apparatus 19 has an inclined elongated chute, referred to by the general reference character 26 (see FIGS. 3 and 4). The chute 26 extends through an opening 27 in the top wall 24, through the interior formed by the panels 20-23 and through an opening 28 in the lower side of the back wall 23 (see FIGS. 3 and 6). The chute 26 can be viewed as comprising three general sections including a feed section 29, a curved transition section 30 and an inclined exit section 31 (See FIG. 4). The terminal end of the feed section 29 exits through the top wall 24 and forms a rectangular opening 32 having a width (w) and depth (d). The width (w) is slightly greater than the width of the envelope 10 and the depth (d) slightly greater than the depth of the envelope 10 to allow clearance and guidance for the envelope. Within the interior of the enclosure and beneath the top wall 24 is a rectangular opening 33 of width w, which extends through both walls of the feed section 29. Joined to the backside wall of the feed section 29 and in alignment with the opening 33 is an exhaust flue 35 extending through an opening 36 in the top wall 24.

A heated gas flow means, for example a gaseous flame source referred to by the general reference character 38 is positioned within the interior of the enclosure and adjacent to the opening 33 to create a flame 39 penetrating through the chute opening 33 and into the confines of the exhaust flue 35. The gaseous flame further serves as a pressurized source to dislodge fuzz and debris from material passing through the chute about the opening 33. Gaseous fumes from the flame 39 may exit through the flue 35 into the atmosphere outside of the top wall 24.

The curved transition section 30 of the chute 26 comprises an arcuate shaped plate 40 engaged at one end to the terminal end of the feed section 29 and curved at a smooth transition arc of an obtuse angle "a." The angular degree "a" of curvature is selected to smoothly and rapidly redirect the direction of the falling envelopes to a less inclined angle relative to that of the feed section 29 and thereby decrease its speed and after its planar orientation relative to the floor panels 25. Vertical to and on opposite sides of the plate 40 are triangular shaped side plates 42 and 44. The width of the plate 40 is substantially equal to the width (w) and the side plates 42 and 44 serve as lateral guides to envelopes in transit.

The inclined exit section 31 of the chute 26 is essentially an extension of the transition section 30. Section 31 is inclined relative to the horizontal at an acute angle "b" selected so as to guide the envelopes through the aperture 28. The side panels 42 and 44 engage the section 31 to serve as lateral guides for the envelopes traveling along the chute 26.

Adjacent to the opening 28 and joined to the exterior of the back wall 23 is a stacking station referred to by the general reference character 46 (see FIG. 6). The stacking station 46 comprises a pair of L-shaped members 48 and 50 with the long leg of each member attached to the back wall 23 and with the short legs facing each other. The members 48 and 50 are spaced apart at a distance "w" such that as the processed envelopes 10 exit through the opening 28 on the chute 26 they can fall in their substantially horizontal orientation intermediate the members 48 and 50. The member 48 and 50 are positioned such that the short legs are spaced with the width between them being less than (w).

The gaseous flame source 38 includes a burner 52 located relative to the feed station 29 such that the center line of the burner is slightly below and parallel to a line 54 orthogonal to the plane of the section 29 and centered between the lateral edges of the aperture 33 (see FIG. 4). The burner 52 is connected to a gas line 56 which is in turn connected to a fuel tank source 57 positioned within the lower area of the enclosure formed by the walls 20-25 (see FIG. 3).

Positioned adjacent to and directed normal to the mouth of the burner 52 and to the line 54 is a spark gap 60 having an ionization flame detector probe 62. The spark gap 60 and probe 62 are electrically joined to an electronic control panel 64 positioned along the lower interior corner formed by the side walls 20, 21, 22 and 25. The electrical control panel 64 includes electronic control circuitry to control the flow of fuel from the fuel tank source 57 to the burner 52, to provide a high voltage, (approximately 50,000 volts) to the spark gap 60, and to sense the presence of the flame 39 by an electrical current flowing from the spark gap 60 through the ionized gases of the flame 39 to the probe 62. If the presence of the flame 39 is not sensed by the circuitry in the electronic control panel 64 within a limited time period after the fuel begins to flow to the burner 52, the flow of fuel is stopped responsive to an appropriate control signal.

FIG. 7 illustrates in greater detail, an exploded view of an embodiment of the burner 52 as used in an operational system. The burner 52 comprises a unitary body 61. At one end, the body 61 has a threaded collar 62 to receive a cylindrical flame nozzle 66. At the opposite end, the body member 61 is threaded to receive a coupling 68 which also engages the fuel line 56. Threaded into the coupling 68 is a fuel meter jet 70 having an axially located metering orifice 72. A cylindrical fuel-air mixing tube 74 is coaxial with the body 61 and the metering orifice 72.

The collar 62 is engaged to the cylindrical fuel-air mixing tube 74 by means of four evenly spaced ribs 78. Between each pair of ribs 78 are a pair of apertures 80 and 82 which extend through the side walls of the fuel-air mixing tube 61 and extend radially relative to the axis of the tube 74. The aperatures 80 and 82 are located so as to be in front of the orifice 72 when the burner 52 is assembled. Also, intermediate each pair of ribs 78 and the threaded ring 76 are openings 84. The annular openings 84 are adapted to allow the admission of air into the area of the burning flame around the terminal end of the fuel-air mixing tube 61. The orifices 80 and 82 serve as metering orifices for allowing the admission of air within the tube prior to its entrance into the fuel-air mixing tube 74 so that it can be mixed with the fuel prior to ignition.

In the preferred embodiment of the apparatus 19, the burner 52 is fabricated by modifying a Companion No. 841 burner purchased from Raychem Corporation, 300 Constitution Dr., Menlo Park, Calif. As purchased, the burner comprises only a single set of orifices in the body 61. For example, the orifices 80 would be the only orifices. In the burner 52, the standard orifices 80 are enlarged to a diameter of between 0.099 to 0.101 inches and, in addition, the second set of orifices 82 are drilled, parallel to the enlarged orifices 80 and with the same diameter. The orifices 80 and 82 are located approximately 0.150 inches apart along the axis of the body. The hydrocarbon fuel supplied to burner 52 comprises a mixture of normally gaseous paraffins and olefins. Propane, the preferred fuel for carrying out this invention from the combined standpoint of cost, availability and ease of storage and use, is supplied to the fuel metering orifice 72 at a pressure in the range of 15 to 20 pounds per square inch guage. This combination of fuel pressure, fuel metering orifice 85 and air metering orifices 80 and 82 produces the high velocity flame 38 which is on the rich side of stoichiometric from the fuel standpoint. Operation of the burner 52 in this manner produces approximately 20,000 British Thermal Units per hour.

In removing fuzz from the envelopes 10, the envelope is first inserted into the opening 32 (see FIG. 3). Due to gravity and the substantial angle of inclination of the feed section 29 of the chute 26, the envelope 10 falls rapidly pass the opening 33 and intersects the flame 39 at a substantially orthogonal angle. However, with the high velocity and temperature of the flame 33 it strikes the envelope 10 and penetrates through the apertures 15, 16 and 17 within the envelope and into the exhaust flue 35. The rapidity with which the envelope 10 falls, results in there being no heat damage to the envelope material sheets 11 and 12. It has been found that with the high velocity flame 39 the gases tend to form a cushion around the area of the material 12 around the apertures 15, 16 and 17 such that there is momentarily no flame abutting the material 12 itself and by the time the cushion collapses and the flame 39 would otherwise ignite the material, the material has already passed the area of the flame 39. However, the hot flame penetrates through the apertures 15, 16 and 17, thereby striking the fuzz 18 and instantly burns and disintegrates all of the fuzz 18 projecting within the openings. The high pressurized flame also tends to dislodge particles from the envelope 12 as well as burn the fuzz which does not dislodge.

As the envelope 10 leaves the feed section 29, it enters into the transition section 30. The transition section 30 tends to slow the speed and change the direction of the envelope 10. The degree "a" of curvature is such that it does not cause the envelope to stop but does slow it down and smoothly change its direction. The envelope then leaves the transition section 30 and slides along the straight, slightly inclined exit section 31 through the opening 28. As the envelope 10 leaves the opening 28, its plane is substantially horizontal. The forward momentum of the envelope causes it to strike the members 48 and 50. As the envelope 10 strikes the short arms of the L-shaped members 48 and 50, the envelope falls due to gravity and comes to rest on the top of the otherwise top most envelope 10 within the stacking station 46.

In the preferred embodiment of the apparatus 19 especially adapted to remove fuzz from envelopes 10 measuring approximately 8×8×0.06 inches, the angle of inclination of the feed section 27 is approximately 75° from the horizontal, and the width "w" is approximately 0.1 inches wider and the depth "d" is approximately 0.38 inches deeper than the width and depth, respectively, of the envelope 10. The rectangular aperture 33 begins at an upper horizontal edge approximately five inches along the path traveled by the envelope 10 and extends approximately 7.5 inches in length and has a width of approximately seven inches centered in the chute wall. The width of the curved section 30 and inclined section 31 are the same as that for the feed section 29.

The burner 52 is located at such a distance from the feed section 29 and below the line 54 that the upward convected envelope of the flame 39 is positioned approximately symmetrically about the point of intersection of the line 54 with the plane of travel of the envelope 10. If necessary, multiple burners 52 may be used and may be required if there are multiple lines of travel of the centers of the apertures in the envelope. In such cases, the burners are spaced laterally relative to one another such that the entire periphery of the edges of the apertures is encompassed by the envelope of the high velocity flame 39 of at least one burner 52.

In operation, the exhaust flue 35 receives the combustion product of the high velocity flame 39 and the fuzz 18 as the fuzz is burned off the edges of the apertures in the envelope 10. These combustion products are conducted away from the source of the high velocity flame 86 and, by the plurality of angular bends, exit vertically upward at the outlet orifice about the top wall 24. Obviously, if necessary, an extension pipe may be extended to the exit so that the exhaust could be to the exterior of the entire building.

Although the present invention has been described in terms of the presently preferred embodiment of method and apparatus, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed:

1. Apparatus for removing fuzz from the edges of sheets of material which is decomposible by heat, the apparatus comprising:
   an elongated inclined chute having an opening about one end for receiving a sheet of material from which fuzz is to be removed, having an aperture intermediate its terminal ends and penetrating laterally through the chute; and
   a heated gas flow means positioned adjacent to said aperture for creating a heated gaseous flow through said aperture, whereby the fuzz from the edges of the moving sheet which pass within the confines of the aperture are decomposed.

2. The apparatus of claim 1 wherein
   the chute includes a planar feed section having an upper terminal end and a lower terminal end and inclined at an angle relative to the horizontal, with the angle being selected so that the material can transverse through said chute section unrestricted and with a continuous motion under the force of gravity; and
   the heated gas flow means includes a burner for receiving a pressurized fuel gas mixture and having a directional orifice for creating a directional flame, oriented to intersect with the plane of said chute section and penetrate said aperture.

3. The apparatus of claim 2 wherein
   the width of said aperture as measured transversely across the width of said chute section, orthogonal to the direction of travel of said material, is slightly narrower than the width of said material.

4. The apparatus of claim 3 wherein
   the chute further includes an arcuate section joined at one terminal end to the lower terminal end of said planar feed section and curved to alter the degree of incline of the chute to an angle less than the angle of incline of said planar feed section.

5. The apparatus of claim 4 wherein
   the chute further includes an exit section, the exit section being joined at one of its terminal ends to the other terminal end of the arcuate section, and said exit section forming a flat planar surface extending from the end of the arcuate section.

6. The apparatus of claim 5 further including
   a support structure forming an elevated top wall, a first and a second side wall joined to the top wall and projecting substantially normal to the top wall, for supporting the top wall in an elevated position; and wherein
   said upper terminal end of said planar feed section is positioned about said top wall to form an opening, and said exit section extends through the plane of said second side wall.

7. The apparatus of claim 6 further including
   an exhaust flue joined at one terminal end to said planar feed section about said aperture, and at its other terminal end about the top wall to form an exhaust path from said aperture to the exterior of the support structure.

8. The apparatus of claim 7 wherein
   the burner includes an elongated fuel-air mixing tube with a plurality of air portals projecting through the tube wall, means for coupling a fuel gas source about one terminal end of said tube, the burner being oriented with the longitudinal axis of said tube being substantially normal to the plane of said planar feed section.

9. The apparatus of claim 8 wherein
   the burner further includes an elongated nozzle coupled about the other terminal end of said tube with the longitudinal axis being substantially normal to the plane of said planar feed section.

10. The apparatus of claim 9 further including
    a stacking station positioned about the exterior of said second side wall adjacent to the other terminal end of said exit section for stacking materials.

11. The apparatus of claim 10 further including
    a pressurized gas fuel source for creating a pressurized flame to dislodge fuzz particles from material transversing said feed section.

* * * * *